United States Patent [19]

Hitotsuyanagi et al.

[11] Patent Number: 5,043,072
[45] Date of Patent: Aug. 27, 1991

[54] METHOD OF TREATING FLUORIDE-CONTAINING WATER

[75] Inventors: Naoto Hitotsuyanagi; Takafumi Murakami; Isamu Katoh, all of Tokyo, Japan

[73] Assignee: Kurita Water Industries Ltd., Tokyo, Japan

[21] Appl. No.: 586,988

[22] Filed: Sep. 24, 1990

[30] Foreign Application Priority Data

Oct. 3, 1989 [JP] Japan ................................. 1-258508

[51] Int. Cl.$^5$ ............................................. B01D 15/04
[52] U.S. Cl. ..................................... 210/638; 210/639; 210/650; 210/651; 210/723; 210/915; 423/244
[58] Field of Search ............... 210/638, 639, 650, 651, 210/181, 722, 682, 723, 915, 670; 423/167, 178, 462, 244 A

[56] References Cited

U.S. PATENT DOCUMENTS

| 2,531,451 | 10/1947 | Maier | 210/915 |
| 3,939,070 | 2/1976 | Roth | 210/638 |
| 4,014,787 | 3/1977 | Shorr | 210/639 |
| 4,297,332 | 10/1981 | Tatani et al. | 423/244 |

FOREIGN PATENT DOCUMENTS 59-9236  3/1984  Japan .

Primary Examiner—Robert A. Dawson
Assistant Examiner—Ana Fortuna
Attorney, Agent, or Firm—Kanesaka and Takeuchi

[57] ABSTRACT

Disclosed is a method of treating fluoride-containing water, which comprises a reaction step where a calcium compound and/or an aluminium compound are/is added to fluoride-containing water while the pH value of the resulting suspended liquid is adjusted to fall within the range of from 6 to 8, and at least a part of the concentrated suspension to be formed in the membrane-separation step of the following stage is added to the suspended liquid and stirred and the resulting suspension is introduced into the circulation tank; a membrane-separation step where the suspension from the circulation tank is treated by membrane-separation to separate it into a permeated solution and a concentrated suspension; a circulation step where at least a part of the concentrated suspension to be taken out from the membrane-separation step is returned back to the reaction step while the remaining part thereof is circulated to the circulation tank; and a step where the permeated solution is taken out from the membrane-separation step as a treated water. The method is free from scaling disorder of the apparatus used and gives a treated water of high quality stably and efficiently.

9 Claims, 1 Drawing Sheet

METHOD OF TREATING FLUORIDE-CONTAINING WATER

FIELD OF THE INVENTION AND RELATED ART STATEMENT

The present invention relates to a method of treating fluoride-containing water and, in particular, to that which may easily be controlled in running with no problem of scaling, which is not influenced by fluctuation of quality of raw water to be treated and which may produce treated water with high quality stably and efficiently.

Hitherto, as a method of treating fluoride-containing water such as a waste liquid resulting from desulfurization of a waste gas, a slaked lime method and an aluminium sulfate method have been known. As a slaked lime method among them, a method has been proposed in which fluoride-containing water to be treated is adjusted to have a pH value of from 10 to 12, a water-soluble calcium compound is added thereto, the precipitate formed is separated from the system, and then supernatant is adjusted to have a pH value of from 4 to 7 and subjected to reverse osmosis treatment and thereafter to a higher degree treatment (Japanese Patent Publication No. 59-9236).

In the above-mentioned conventional methods, the slaked lime method as illustrated in Japanese Patent Publication No. 59-9236 has various drawbacks that it requires a precipitation tank, the scale component (calcium compound) is concentrated since the method uses a reverse osmosis(RO) membrane and the method often suffers from the hindrance clogging by scaling of gypsum and the like. Additionally, addition of calcium hydroxide is performed to adjust a pH value, which corresponds only to the acidity of the fluoride-containing water of the raw water to be treated and therefore could not cope with fluctuation of the fluoride ion of itself in the raw water. Accordingly, the method has another drawback that the quality of the treated water is often deteriorated. Because of the reasons, control in running the slaked lime process for the purpose of stably recovering treated water with high quality is fairly difficult.

On the other hand, the aluminium sulfate method also has almost the same problem as mentioned above, when calcium hydroxide ($Ca(OH)_2$) is used as a pH-adjusting agent in the method. Where sodium hydroxide (NaOH) is used as the pH-adjusting agent, the method would be free from the scaling disorder. However, since addition of aluminum sulfate is to be effected by quantitative injection, the method is also to have a drawback that it could not cope at all with fluctuation of the quality (fluoride ion concentration) of the raw water to be treated. Accordingly, in order to prevent deterioration of the quality of the treated water caused by fluctuation of the quality of the raw water to be treated in the aluminium sulfate method, it is necessary to add an excess amount of aluminium sulfate. In such a case, however, the running cost of the aluminium sulfate method becomes extremely high and expensive.

OBJECT AND SUMMARY OF THE INVENTION

An object of the present invention is to overcome the above-mentioned problems in the prior art methods and to provide a method of treating a fluoride-containing water which may easily be controlled in running the method with no problem of scaling, which is not influenced by fluctuation of quality of the raw water to be treated and which may produce treated water with high quality stably and efficiently.

Specifically, there is provided in accordance with the present invention a method of treating fluoride-containing water, which comprises:

a reaction step where a calcium compound and/or an aluminium compound are/is added to fluoride-containing water while a pH value of the suspended liquid is adjusted to fall within the range of from 6 to 8 and the liquid is stirred, and at least a part of a concentrated suspension formed in a membrane-separation step of the following stage is added to the suspended liquid and the resulting suspension is introduced into the circulation tank;

a membrane-separation step where the suspension from the circulation tank is treated by membrane-separation to separate it into a permeated solution and a concentrated suspension; and a circulation step where at least a part of the concentrated suspension to be taken out from the membrane-separation step is returned back to the reaction step while the remaining part thereof is circulated to the circulation tank.

Desirably, the method of the present invention is combined with an adsorption treatment step of further treating the permeated solution.

By adding a calcium compound to the fluoride-containing water to be treated by the method of the present invention, the fluoride ion in water precipitates out as $CaF_2$. By adding an aluminium compound thereto, the fluoride ion in water is adsorbed to the aluminium compound, which then precipitates out. For precipitation of the fluoride ion, the concentrated suspension is returned back to the reaction step from the membrane-separation step of the following stage, whereby SS (suspended solid) in the concentrated suspension acts as a seed crystal to thereby reduce the Ca concentration in the reaction system because of the crystallization effect and to prevent scaling. Additionally, the sludge of $Ca(OH)_2$, $Al(OH)_3$ or the like does not permeate through the membrane but is returned back to the reaction step and it displays a fluoride ion-adsorbing function. In the process, since the reaction system is free from change of the pH value thereof, dissolution of aluminium ion or fluoride ion from SS does not occur. Accordingly, since the calcium compound and others can be maintained and circulated in the reaction system, the method of the present invention may sufficiently cope with the fluctuation of the quality of the raw water to be treated by the method and therefore the quality of the treated water is stabilized.

Where the suspension as prepared in the reaction step is directly introduced into the membrane-separation step, a scale is to be formed on the surface of the separation membrane because of the non-reacted calcium component and others. Since a gypsum which is a component of the scale requires a long time before formation thereof, a gypsum is formed and scaled on the surface of the separation membrane after completion of the reaction step, in many cases. As opposed to this, since a circulation tank is provided in the line of the method of the present invention where the suspension in the reaction step is not directly introduced into the membrane-separation step but is once stored and kept in the circulation tank and then introduced into the membrane-separation step from the circulation tank, scaling on the surface of the separation-membrane may be prevented. Additionally, since part of the concentrated suspension from the membrane-separation step is fed into the circulation tank, scaling in the circulation tank may also be prevented because of the crystallization effect of SS in the concentrated suspension, as mentioned above.

In the membrane-separation step, the fluoride-containing precipitates as precipiated in the reaction step and other fine SS may highly be removed.

As one preferred embodiment of the present invention, the permeated solution as prepared in the membrane-separation step is further subjected to adsorption treatment, whereby treated water having a higher quality can be obtained.

DESCRIPTION OF THE PREFERRED EMBODIMENTS

Figure 1:
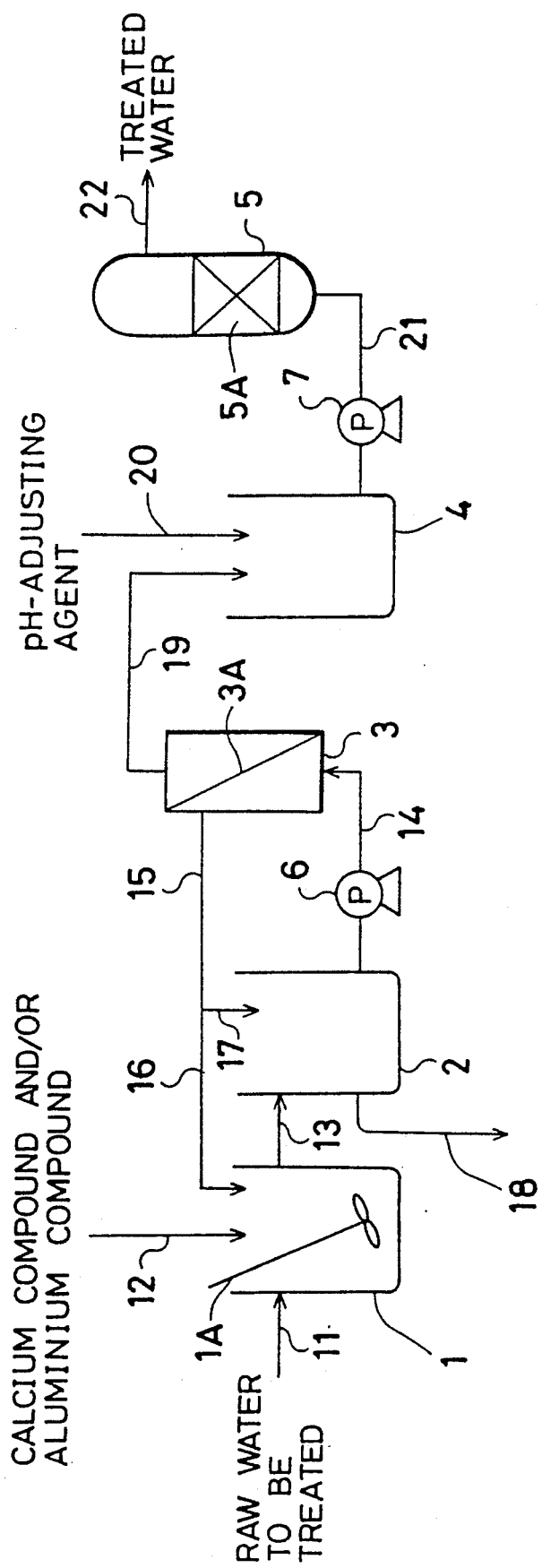
FIG. 1 is a flow chart to show one embodiment of the method of the present invention for treating a fluoride-containing water.

Preferred embodiments of the present invention will be explained hereunder, with reference to the drawing attached hereto.

FIG. 1 is a flow chart to show one embodiment of the method of the present invention for treating fluoride-containing water.

In the illustrated process, fluoride-containing water of raw water to be treated is fed into a reaction tank (1) which is equipped with a stirrer (1A) through a pipe (11), and a calcium compound and/or an aluminium compound and optionally a pH-adjusting agent are added to the reaction tank (1) through a pipe (12) so that the pH value of the reaction system is adjusted to fall within the range of from 6 to 8 while at least a part of the concentrated suspension as treated by membrane-separation and returned back from a membrane-separation equipment (3) of the following stage via pipes (15) and (16) is added to the tank (1) and stirred therein.

As the calcium compound to be added to the reaction tank (1), there are mentioned calcium hydroxide (Ca(OH)$_2$), calcium oxide (CaO), etc.

As the aluminium compound also to be added to the reaction tank (1), there are mentioned aluminum sulfate (Al$_2$(SO$_4$)$_3$), polyaluminium chloride (PAC), etc. These may be used singly or in combination of two or more of them.

In the reaction step, a pH-adjusting agent is optionally added to the reaction tank for the purpose of adjusting the pH value of the reaction system in the tank to fall within the range of from 6 to 8, preferably from 6 to 7. Where Ca(OH)$_2$ or the like is added, any additional pH-adjusting agent is unnecessary since Ca(OH)$_2$ itself acts as a pH-adjusting agent. However, where aluminium sulfate is added, an alkali such as NaOH, Ca(OH)$_2$ or the like is added as a pH-adjusting agent. As the problem of scaling disorder has been solved in the present invention and the method of the present invention is therefore free from the scaling disorder which occurs in carrying out the conventional aluminium sulfate method, it is advanatgeous to employ Ca(OH)$_2$ as the pH-adjusting agent.

By addition of the calcium compound and/or aluminium compound to adjust the pH value of the reaction liquid to fall within the range of from 6 to 8, the fluoride ion in the raw water to be treated is solidified. Precisely, the fluoride ion precipitates out as CaF$_2$ in the presence of the calcium compound, and it also precipitates out as being adsorbed by the aluminium compound. In the process, since the concentrated suspension as produced in the membrane-separation equipment (3) in the following stage is returned back to the reaction tank (1), SS in the concentrated suspension acts as a seed crystal to thereby prevent scaling in the reaction tank.

The amount of the calcium compound and/or the aluminium compound to be added to the reaction tank (1) is, in general, preferably approximately from 0.5 to 3 times of the fluoride ion in the raw water to be treated. In geneaval, as a waste liquid resulting from desulfurization of a waste gas or the like contains calcium and aluminium compounds, the amount of the compounds to be added may be in the above-mentioned range including the compounds already existing in the raw water to be treated. The amount of the concentrated suspension to be returned back from the membrane-separation equipment (3) to the reaction tank (1) is preferably approximately from 0.1 to 4 times of the amount of the raw water to be treated, though varying in accordance with the SS concentration in the concentrated suspension. It is also a known method that the flocculated sludge caused by adding a flocculating agent to a raw water is partly returned to such a flocculating step in order to prevent scale trouble. But, the diameter of the suspended solid in the concentrated suspension obtained by the membrane separation equipment is smaller than that of a flocculated sludge. Therefore, the amount of returned concentrated suspension becomes less.

The reaction time in the reaction tank (1) is generally 30 minutes or more. Since the time necessary for fully forming the precipitate from the reaction liquid in the reaction tank (1), especially the time necessary for forming a gypsum from the liquid, is about 30 minutes, it is desired that the reaction time in the reaction tank (1) is to be 30 minutes or more.

The suspended liquid as produced in the reaction tank (1) is then introduced into a circulation tank (2) via a pipe (13).

To the circulation tank (2) is introduced the remaining part of the concentrated suspension as returned back from the membrane-separation equipment (3) of the following stage via the pipe (15), a part of the concentrated suspension being returned back to the reaction tank (1) via the pipe (16). Both the suspension from the reaction tank (1) and the concentrated suspension from the membrane-separation equipment (3) in the circulation tank (2) are introduced into the membrane-separation equipment (3) via a pipe (14) equipped with a pump (6), where they are subjected to membrane-separation treatment with a separation membrane (3A).

The retention time of the combined suspensions in the circulation tank (2) is desirably set to fall within the range of approximately from 1 to 20 hours. As SS is concentrated and deposited in the cirulation tank (2) with the lapse of time, the deposited SS is taken out of the system from the bottom of the tank through a pipe (18).

As the separation-membrane (3A) in the membrane-separation equipment (3), a microfilter (MF) membrane or an ultrafilter (UF) membrane is desirably used. In the case of using an MF membrane, if the pore diameter is one micron or more, the fluoride-containing precipitate would permeate through the membrane. Accordingly, the MF membrane to be used in the present invention is preferably one having a pore diameter of 0.5 micron or less. In the membrane-separation device (3) of the type, the non-reacted calcium compound and aluminium compound in the suspension do not permeate through the membrane but remain in the concentrated suspension and are therefore returned back to the reaction tank (1). Accordingly, the thus returned compounds display a function of fixing the fluoride ion in the reaction tank (1), extremely advantageously.

As a reverse osmosis membrane has a capacity of removing $Ca^{2+}$, $F^-$ and $SO_4^{2-}$ to cause scaling on the surface of the membrane because of concentration polarization thereon, it is not preferred for use in the present invention.

As mentioned above, a part of the concentrated suspension from the membrane-separation equipment (3) is returned back to the reaction tank (1) via the pipes (15) and (16), while the remaining part thereof is circulated to the circulation tank (2) via the pipe (17).

On the other hand, the permeated solution formed in the membrane-separation equipment(3) is fed into a pH-adjusting tank (4) via a pipe (19), to which tank is optionally added a pH-adjusting agent, such as NaOH, HCl or the like, through a pipe (20) so as to adjust the pH value of the permeated solution, and thereafter the solution is introduced into an adsorption column (5) via a pipe (21) equipped with a pump (7).

The adsorption column (5) contains an adsorbent (5A), which may be a fluoride-adsorbing material capable of adsorbing the fluoride ion as still remaining in the permeated solution from the membrane-separation equipment (3) so as to remove the ion from the solution or a COD-adsorbing material capable of adsorbing and removing the COD component therefrom. Accordingly, it is necessary that the pH value of the permeated solution is adjusted to have an optimum pH value in the pH-adjusting tank (4) of the previous stage, in accordance with the kind of the adsorbent (5A) to be used in the adsorption column (5). For instance, where the adsorbent (5A) in the adsoprion column (5) is a fluoride ion-adsorbing material, the pH value of the permeated solution is preferably adjusted to fall within the range of approximately from 3 to 7; and where it is a COD-adsorbing material, the pH value thereof is preferably adjusted to fall within the range of approximately from 2 to 9.

As the fluoride ion-adsorbing material usable in the present invention, there are mentioned tritium, zirconium, titanium or hafnium-type cation-exchange resins, strong or weak acidic cation-exchange resins, haloalkyl-silane-type adsorbent resins, weak basic anion-exchange resins, rare earth metal oxide hydrate-type chelate resins, aluminium salt-type chelate resins and the like adsorbent resins, as well as active alumina or magnesia-type adsorbents. As the COD-adsorbing materials, there are mentioned gel-type or MR(macro reticular)-type weak, medium or strong basic anion-exchange resins and the like COD-adsorbent resins, as well as active charcoal and the like.

The treated water as obtained after adsorption treatment with such adsorbent (5A) is taken out of the system via a pipe (22) optionally after a pH adjustment.

The fluoride-containing water as a raw water which is treated by the method of the present invention is not specifically defined but may be, for example, a waste liquid resulting from desulfurization and/or denifrification of a waste gas, a waste liquid from an aluminium electrolytic refining step, a waste liquid from a step of manufacturing a phosphate fertilizer, a waste liquid from a step of washing electric parts, a waste liquid from an uranium ore-refining step, a waste liquid from a washing step in a surface-treatment process, etc.

The embodiment as illustrated in FIG. 1 is one example of the present invention and it does not whatsoever restrict the scope of the present invention. In the illustrated embodiment, the permeated solution from the membrane-separation equipment (3) is further subjected to the adsorption treatment. However, if the permeated solution has a sufficiently high quality, the adsorption treatment is unnecessary. On the other hand, if the quality of the permeated solution is not sufficient, a higher fluoride-treatment with a fluoride ion-adsorbent is effected. If the permeated solution contains COD, it is treated with a COD-adsorbent so as to remove COD therefrom. Needless to say, the adsorption treatment may be effected either by the use of an upward current stream or by the use of a downward current stream. In general, however, fluoride ion-adsorption and COD-adsorption are effected by the use of a downward current stream. If desired, the COD-adsorption treatment may be followed by the fluoride ion-adsorption treatment.

In accordance with the method of the present invention of treating a fluoride-containing water, the following effects are attained.

(1) As SS concentrated in the membrane-separation treatment is directly returned back to the raw water to be treated, the dissolved Ca concentration may be reduced because of the crystallization effect and a scaling trouble may be prevented.

(2) Since the non-reacted calcium compound and the like can be maintained in the reaction system, the method may cope with variation of the quality of the raw water to be treated and therefore it may prevent the quality of the treated water from lowering. Accordingly, addition of any excess chemicals is unnecessary, despite of variation of the quality of the raw water to be treated.

(3) The treatment flow of itself is simple and is free from problems of worsening of the quality of the treated water and of scaling trouble, and therefore control in running the method is easy.

(4) Neither a large-sized precipitation pond nor a filter is necessary, and the space for the apparatus for the method may be reduced.

(5) pH-adjustment, which has to be effected several times in the prior art method, may be effected once in the method of the present invention, and any high polymer coagulant is unnecessary. That is, the number of the chemical agents to be used in the method of the present invention as well as the amount thereof may be reduced.

Accordingly, treated water with high quality can be obtained stably and efficiently at a low operation cost by the method of the present invention.

In particular, the method of the present invention is desirably combined with an adsorption treatment where the permeated solution from the membrane-separation step is further treated for removal of the remaining impurities therefrom, whereby a treated water having a higher quality can be obtained.

Next, some experimental examples will be mentioned below.

EXPERIMENTAL EXAMPLE 1

In accordance with the method as illustrated in FIG. 1, a waste liquid resulting from desulfurization of a waste gas, which had the following quality, was treated.

| Quality of Raw Water (waste liquid) to be Treated: |
| --- |
| F 370 mg/liter |
| COD 30 mg/liter |
| pH 1.6 |
| Ca 600 mg/liter |
| Al 270 g/liter |

The raw water to be treated is introduced into the reaction tank (1), while $Ca(OH)_2$ and $Al_2(SO_4)_3$ were added to the reaction tank in a proportion as mentioned below whereupon the pH value of the reaction system in the tank was adjusted to be 7; and the concentrated suspension (SS concentration: 40000 mg/liter) was returned back from the membrane-separation equipment in a proportion mentioned below, and the reaction system in the tank was stirred for 30 minutes and reacted. The suspension is obtained by the reaction was then introduced into the circulation tank (2) and was thereafter fed into the membrane-separation equipment (3) having a capacity mentioned below, along with a part of the concentrated suspension as returned back to be circulated.

REACTION TANK

Amount of $Ca(OH)_2$ Added: 4000 mg/liter
Amount of $Al(SO_4)_3$ Added: 0 mg/liter
pH: 7
Amount of Concentrated Suspension Returned Back: Same as the amount of the raw water in the tank.

CIRCULATION TANK

Amount of Concentrated Water Returned Back for Circulation: 60 times of the amount of the raw water as treated.
Retention Time: 10 hours

MEMBRANE-SEPARATION EQUIPMENT

Separation-Membrane: Microfilter Membrane (made of polypropylene) with nominal pore diameter of 0.2 micron.

As a result, the fluoride concentration in the treated water (membrane-permeated solution) was stable to be from 17 to 25 mg/liter, and the flux of the membrane-separation equipment was 10 $m^3/m^2$.day. Stable running was possible for 30 days or more, with no scaling disorder.

EXPERIMENTAL EXAMPLE 2

Comparative Example

The same process as in Experimental Example 1 was carried out, except that the concentrated suspension from the membrane-separation equipment (3) was not returned back to the reaction tank (1). As a result, scaling was noticeable in the reaction tank, and continuous running of the apparatus became difficult.

EXPERIMENTAL EXAMPLE 3

Comparative Example

The same process as in Experimental Example 1 was also carried out, except that the circulation tank (2) was not provided but the suspension from the reaction tank (1) was directly supplied to the membrane-separation equipment (3) and the concentrated suspension from the membrane-separation equipment (3) was returned back to the reaction tank (1).

As a result, the membrane-separation equipment was scaled. The flux of 10 $m^3/m^2$.day was maintained only for 2 days, and the flux lowered to 2 $m^3/m^2$.day in 4 days.

EXPERIMENTAL EXAMPLE 4

Hydrochloric acid was added to the treated water (membrane-permeated water) as obtained in Experimental Example 1 so that the pH value of the resulting water was adjusted to be 3. Afterwards, the water was passed through a column filled with a cerium oxide hydrate-type chelate resin at a space velocity (SV) of 20 $hr^{-1}$. As a result, the fluoride concentration in the finally treated water was 1 mg/liter or less.

While the invention has been described in detail and with reference to specific embodiments thereof, it will be apparent to one skilled in the art that various changes and modifications can be made therein without departing from the spirit and scope thereof.

What is claimed is:

1. A method of treating fluoride-containing water, comprising:
   a reaction step where at least one of a calcium compound and an aluminum compound is added to a fluoride-containing water to form a suspended liquid while pH value of the resulting suspended liquid is adjusted to fall within a range from 6 to 8, and the liquid is stirred, and the resulting suspension is introduced into a circulation tank,
   a membrane-separation step where the suspension from the circulation tank is treated by membrane-separation to separate it into a permeated solution and a concentrated suspension;
   a circulation step where at least a part of the concentrated suspension is taken out from the membrane-separation step and is returned back to the reaction step while the remaining part thereof is circulated to the circulation tank; and wherein the amount of the concentrated suspension to be returned back from the membrane separation step to the reaction step is from 0.1 to 0.4 times of the amount of the fluoride-containing water to be treated and
   a step where the permeated solution is taken out from the membrane-separation step as a treated water.

2. The method of treating fluoride-containing water as claimed in claim 1, in which the permeated solution is further subjected to adsorption treatment and thereafter taken out as a treated water.

3. The method of treating fluoride-containing water as claimed in claim 1, in which the amount of the calcium compound and/or aluminium compound be added is from 0.5 to 3 times of to the fluoride ion content in the fluoride-containing water to be treated.

4. The method of treating fluoride-containing water as claimed in claim 1, in which the reaction time in the reaction step is 30 minutes or more.

5. The method of treating fluoride-containing water as claimed in claim 1, in which the separation-membrane to be used in the membrane-separation step is a microfilter membrane or an ultrafilter membrane.

6. The method of treating fluoride-containing water as claimed in claim 2, in which the adsorbent to be used in the adsorption treatment step is a fluoride-adsorbing material and/or a COD-adsorbing material.

7. The method of treating fluoride-containing water as claimed in claim 1, in which a fluoride-containing water is waste liquid resulting from desulfurization or/and denitrification of a waste gas.

8. A method of treating fluoride-containing water, comprising:

a reaction step where at least one of a calcium compound and an aluminum compound is added to a fluoride-containing water to form a suspended liquid while pH value of the resulting suspended liquid is adjusted to fall within a range from 6 to 8 and the liquid is stirred, and the resulting suspension is introduced into a circulation tank, a membrane-separations step where the suspension from the circulation tank is treated by membrane-separation to separate it into a permeated solution and a concentrated suspension;

a circulation step where at least a part of the concentrated suspension is taken out from the membrane-separation step and is returned back to the reaction step while the remaining part thereof is transferred to the circulation tank so that suspended solid in the concentrated suspension acts as a seed crystal to thereby reduce Ca concentration in the reaction step and reduce scaling, and sludge in the concentrated suspension adsorbs fluoride ion; and a step where the permeated solution is taken out from the membrane-separation step as a treated water.

9. A method according to claim 8, further comprising removing suspended solid deposited in the circulation tank.

* * * * *

UNITED STATES PATENT AND TRADEMARK OFFICE
CERTIFICATE OF CORRECTION

PATENT NO. : 5,043,072

DATED : August 27, 1991

INVENTOR(S) : Naoto Hitotsuyanagi et al

It is certified that error appears in the above-identified patent and that said Letters Patent is hereby corrected as shown below:

Column 8, line 43 (Claim 1), change "0.1 to 0.4 times" to
--0.1-4.0 times--.

Signed and Sealed this

Sixteenth Day of February, 1993

Attest:

STEPHEN G. KUNIN

*Attesting Officer*   Acting Commissioner of Patents and Trademarks